Patented July 7, 1936

2,046,345

UNITED STATES PATENT OFFICE 2,046,345

METHOD OF PRODUCING CONCENTRATED PHYTOSTERIN-CONTAINING PRODUCTS

Albert Schwieger, Hamburg, Germany, assignor to firm Hanseatische Muhlenwerke Aktiengesellschaft, Hamburg, Germany No Drawing. Application November 9, 1934, Serial No. 752,378. In Germany December 22, 1933

6 Claims. (Cl. 260—153)

It is known that phytosterins occur (in a small percentage) in vegetable materials associated with vegetable oils and fats.

I have now found that concentrated or pure phytosterin products can be obtained if the starting materials (i. e. fatty oil containing phytosterin, or distillates therefrom as described below) are subjected to a fractional separation by addition of alcohol on the basis of their solubility relationships and indeed this separation can be effected by fractional crystallization or by fractional solution.

According to a preferred embodiment of the present invention use is made as starting material of the distillate obtained by the treatment of vegetable oils or fats with steam at temperatures above about 200° C. and preferably under high vacuum, for example corresponding to an absolute pressure of about 1 to 10 mm. of mercury but I do not restrict the invention to this degree of vacuum.

Example 1.—10 kgs. of the alcohol extract from pre-refined soya oil that has been obtained according to the alcohol washing described in German Patent No. 371,813 or the corresponding U. S. Patent 1,895,424, as an extract containing a mixture of free phytosterin and phytosterin esters in varying proportion of about 1–8%, and associated neutral oils, fatty acids, phosphatides, slimy materials, bitter materials, coloring materials, sugars, starch, albumens and vegetable gums and the like, are mixed with 30 kgs., of 97% alcohol and allowed to crystallize at suitable temperature preferably between about 0° and about 10° C. The necessary time varies, according to the composition of the starting material, between several hours and several weeks.

The crystals obtained are centrifuged. They have a phytosterin content of about 25%. The liquid centrifuged off consists of alcohol and the stated associated materials.

Example 2.—100 kgs. of an acetone extract which was obtained by the extraction of dried soya lecithin of about 60% purity, (which soya lecithin contains about 35% soya oil as well as coloring materials, bitter materials and flavoring materials), is slowly cooled down with addition of 20 kgs. of 90% alcohol to a temperature of from 6 to 10° C. The phytosterin separates as a result of the cooling down, preferably after seeding with phytosterin crystals, together with fatty acids and impurities in coarse crystalline form. If the crystal mixture is now brought gradually to raised temperature, for example to room temperature, the associated materials for the greater part go into solution and may be separated from the phytosterin crystals by centrifuging. The crystals can also be placed on a suction filter and then washed with cold alcohol. About 5 kgs. of raw phytosterin is obtained with a content of about 10% phytosterin.

Example 3.—100 kgs. of distillate from steam distillation such as is obtained by treatment of soya oil with steam under high vacuum at temperatures of for example 200° C. and which contains volatile fatty acids, neutral oils, aldehydes, hydrocarbons or the like, are mixed with 50 kgs. of technical denatured 92% alcohol and allowed to stand at a temperature of 5° C. for several days. The crystal pulp separating is centrifuged in a separator (like a centrifugal cream separator) or in a drum centrifuge; the crystal cake contains about 20% of phytosterin. The mother liquor centrifuged off can according to its phytosterin content be again subjected to crystallization one or more times in order to obtain the quantities of phytosterin contained therein.

Example 4.—10 kgs. of an enriched raw phytosterin preparation obtained according to Examples 1 to 3 with a phytosterin content of 25% are dissolved in 30 kgs. of a 15% alcoholic potash lye and saponified by boiling under a reflux condenser. The saponification product is then cooled down to a temperature of 0 to 10° C. and allowed to crystallize. If desired, the product after saponification can be diluted with a further 30 kgs. of alcohol in order to obtain a better crystallization.

By means of the saponification process, not only are the neutral fats and fatty acids converted into soaps which remain dissolved in the alcoholic solution but also the phytosterin fatty acid esters are split up (saponified) liberating the phytosterin. After standing for 3 days, 1.9 kgs. of phytosterin in fine crystalline needles separate and can be recrystallized from a three to five fold proportion of pure alcohol, if desired with simultaneous decolorization.

In this manner a fairly pure product is obtained which is constituted of sitosterin, stigmasterin, traces of ergosterin and the like. This product may contain 98% or more of phytosterin.

Example 5.—10 kgs. of enriched raw phytosterin according to Examples 1 to 3, are saponified with 25 kgs. of a 10% alcoholic soda lye under a reflux condenser, whereupon it is diluted with a two-fold portion of water and the sterin separated by a repeated shaking with benzine of low boiling point, i. e. of boiling point 60 to 80° C. For the shaking about 30 to 50 kgs. of benzine are required. From the benzine solution, sterin is recovered by removal of the residue of soap and the solvent material. In this manner 2.1 kgs. of a fairly pure phytosterin (e. g. 80 to 90% purity) is obtained which by recrystallization in alcohol, preferably with suitable cooling down, can be further purified.

I claim:—

1. Process for the production of phytosterin-containing products, which includes the steps of subjecting raw unsaponified material containing phytosterin to the action of alcohol, separating the phase containing the greater proportion of phytosterin, subjecting said phase to saponification, and extracting phytosterin-containing products from the product of saponification by means of an organic solvent in which phytosterin is soluble.

2. Process for the production of phytosterin-containing products which includes the steps of treating the acetone type of extract obtained in lecithin purification with alcohol and recovering the phase containing the higher percentage of phytosterin.

3. Process for the production of phytosterin-containing products which includes the step of treating alcohol extracts obtained by direct treatment of fatty oil with alcohol, to further treatment with alcohol and separating the phase containing the higher percentage of phytosterin.

4. Process for the production of phytosterin-containing products, which includes the steps of subjecting raw oil material containing phytosterin to a steam distillation under a pressure much below atmospheric and at a temperature above about 200° C. and recovering phytosterin-containing products from the distillate.

5. Process for the production of phytosterin-containing products, which includes the steps of subjecting vegetable oils to a treatment with steam under a pressure much below atmospheric, and at a temperature above 200° C. and recovering phytosterin-containing products from the distillate.

6. Process for the production of phytosterin-containing products, which includes the steps of subjecting raw oil material containing phytosterin to a steam distillation under reduced pressure and at a temperature above 200° C., condensing the steam together with the entrained phytosterin-containing substances, subjecting the condensed liquid to the action of alcohol, separating the phase containing the greater proportion of phytosterin, subjecting said phase to saponification and extracting phytosterin-enriched products from the product of saponification by means of an organic solvent which is capable of separating the phytosterin from other materials present in said intermediate material.

ALBERT SCHWIEGER.